United States Patent
Hunter et al.

(10) Patent No.: US 7,952,396 B1
(45) Date of Patent: May 31, 2011

(54) AWG HAVING ARBITRARY FACTOR INTERPOLATOR AND FIXED FREQUENCY DAC SAMPLING CLOCK

(75) Inventors: Matthew T. Hunter, Orlando, FL (US); Wasfy B. Mikhael, Winter Springs, FL (US)

(73) Assignees: University of Central Florida Research Foundation, Inc., Orlando, FL (US); DME Corporation, Orlando, FL (US)

( * ) Notice: Subject to any disclaimer, the term of this patent is extended or adjusted under 35 U.S.C. 154(b) by 0 days.

(21) Appl. No.: 12/555,518

(22) Filed: Sep. 8, 2009

Related U.S. Application Data

(60) Provisional application No. 61/095,193, filed on Sep. 8, 2008.

(51) Int. Cl.
*H03B 21/00* (2006.01)
(52) U.S. Cl. .................................................. 327/106
(58) Field of Classification Search .................. 327/105, 327/164, 106
See application file for complete search history.

(56) References Cited

U.S. PATENT DOCUMENTS

| 7,340,357 B2 * | 3/2008 | Ammerman et al. ........... 702/66 |
| 2010/0164555 A1 * | 7/2010 | Takahashi et al. ............ 327/106 |

OTHER PUBLICATIONS

Hunter, et al. "Direct IF Synthesis of Vector Modulated Signals Using Real-Time Signal Processing" IEEE International Instrumentation and Measurement Technology Conference Victoria, Vancouver Island, Canada, May 12-15, 2008.

* cited by examiner

*Primary Examiner* — Lincoln Donovan
*Assistant Examiner* — Daniel Rojas
(74) *Attorney, Agent, or Firm* — Jetter & Associates, P.A.

(57) ABSTRACT

An AWG includes a waveform memory providing a digital waveform signal at a sample rate and an arbitrary factor interpolator (AFI) coupled to receive the digital waveform signal or a processed digital waveform signal. A complex mixer for carrier modulation is coupled to the AFI which outputs a complex band pass signal. A DAC is coupled to an output of the complex mixer for receiving the complex band pass signal to provide an analog output signal. A fixed frequency sample clock clocks the DAC to provide a fixed DAC sample rate. The DAC provides a data clock signal to a sample request controller that generates a sample request signal that is coupled to the waveform memory for requesting the digital waveform signal from the waveform memory. The interpolated digital signal is sampled at the fixed DAC sample rate independent of the sample rate of digital waveform signal.

20 Claims, 8 Drawing Sheets

AWG HAVING ARBITRARY FACTOR INTERPOLATOR AND FIXED FREQUENCY DAC SAMPLING CLOCK

CROSS REFERENCE TO RELATED APPLICATIONS

This application claims the benefit of Provisional Application Ser. No. 61/095,193 entitled "Fixed Sample Clock FPGA-based Arbitrary Waveform Generator", filed Sep. 8, 2008, which is herein incorporated by reference in its entirety.

FIELD

Disclosed embodiments relate to DSP-based arbitrary waveform generators (AWGs).

BACKGROUND

Synthetic Instruments (SI) allow multiple functions to be synthesized from a limited set of "generic" SI components, as opposed to discrete instrument types such as a spectrum analyzer. Examples of generic components include Down Converters (DCs), digitizers, Up Converters (UCs), and Arbitrary Waveform Generators (AWGs).

The stimulus functionality of a SI comprises a digital source, Digital to Analog Converter (DAC), and an Up Converter (UC). The DAC can reside on an AWG providing the baseband/Intermediate Frequency (IF) source to the UC. The digital source provides the flexible modulation functionality while the UC provides the frequency translation functionality.

Digital Signal Processing (DSP) plays a central role in the implementation of SIs. Moving as many signal processing tasks as possible from the analog domain to the digital domain makes for a more flexible system, such as by adding programmability. Advances in DSP can also be exploited to reduce the complexity of, or remove, the analog components. As known in the art, DSP-oriented functions can be implemented from field programmable gate arrays (FPGAs), which are semiconductor devices that can be configured (and generally reconfigured) by the customer or designer after manufacturing and assembly (e.g., programmed via programming software). FPGAs are conventionally programmed using a logic circuit diagram or a source code in a hardware description language (HDL) to specify how the chip will function (e.g., filter design, sampling rates).

Some recent AWGs provide Field Programmable Gate Array (FPGA) based Real-Time Signal Processing (RTSP) for Digital Up Conversion (DUC) and interpolation by integer factors. One of the many advantages of this approach is the dramatic savings in waveform memory it allows. This saving comes because as the interpolation, or sample rate increases, and carrier modulation is performed in real time, so that it is only necessary to store the minimum number of samples required to reconstruct the baseband I/Q representation of the signal. Some such AWGs fix the clock sample rate of the DAC and allow the waveform to be stored in memory at an integer submultiple of the DAC sample rate. Interpolation by integer factors increases the sample rate of the waveform to the DAC sample rate in real time. This achieves some waveform memory compression and allows the use of a single reconstruction filter to eliminate DAC images. However, integer factor interpolation is inflexible since the choice of sample rates is quite restricted.

Other known AWGs provide two sample clocks. One sample clock provides a spectrally pure integer submultiple of the maximum clock rate for high performance, and the other sample clock offers the flexibility of high resolution frequency selection. Besides an extra (i.e. a second) sample clock that adds to the hardware complexity and cost, the wideband Spurious Free Dynamic Range (SFDR) of current integrated direct digital synthesis (DDS) chips is generally limited to the 40 to 60 dB range for typical sample rates approaching 100 MHz or more. These spurious components cause undesirable distortion in the output spectrum of the AWG which compromises spectral purity.

SUMMARY

This Summary is provided to comply with 37 C.F.R. §1.73, presenting a summary of the invention to briefly indicate the nature and substance of the invention. It is submitted with the understanding that it will not be used to interpret or limit the scope or meaning of the claims.

Embodiments of the invention describe AWGs that comprise a fixed frequency DAC sample clock in conjunction with an arbitrary factor interpolator (AFI) that provides real-time continuously variable Sample Rate Conversion (SRC) by arbitrary factors. Such AWGs generally provide better performance compared to conventional DSP-based AWGs as demonstrated in the Examples provided near the end of this application, and are less complex and as a result of reduced complexity are generally less costly and are more reliable.

The AWGs receive waveform samples stored in memory at an arbitrary sample rate (e.g., signals such as digital modulation symbols from a waveform memory) and provide an analog waveform output. As used herein, "arbitrary factor" applied to interpolation factors refers to use of both conventional integer factors as well as non-conventional non-integer interpolation factors.

The AFI can comprise an optional pre-processing digital pulse shaping filter coupled to the AFI that is coupled to a complex mixer for carrier modulation (e.g., to IF), wherein the complex mixer outputs a complex band pass signal. The digital pulse shaping filter is optional, but can provide further memory compression for digitally modulated signals. A DAC is coupled to an output of the complex mixer. A fixed frequency sample clock is provided for clocking the DAC to provide a fixed DAC sample rate. The AFI is operable to convert the waveform samples from an arbitrary (i.e. variable) sample rate to the fixed DAC sample rate.

Since the DAC sample clock is fixed, the system increases the sample rate of the waveform stored in the waveform memory by an arbitrary factor R to match the DAC sampling rate to allow real-time continuously variable SRC by arbitrary factors. As used herein, "real-time" refers to a data path exclusive of intermediate storage, with the exception of digital delay elements (e.g., registers). To enable SRC, procedures are described to request samples from the waveform memory at only appropriate time instants.

Thus, waveforms created at any sample rate are interpolated by the system to the fixed DAC sample rate in real-time. As a result, additional lower performance analog hardware required in conventional AWG approaches comprising multiple reconstruction filters and/or two or more sample clocks that provide different frequencies are not needed.

DETAILED DESCRIPTION

Figure 1A:
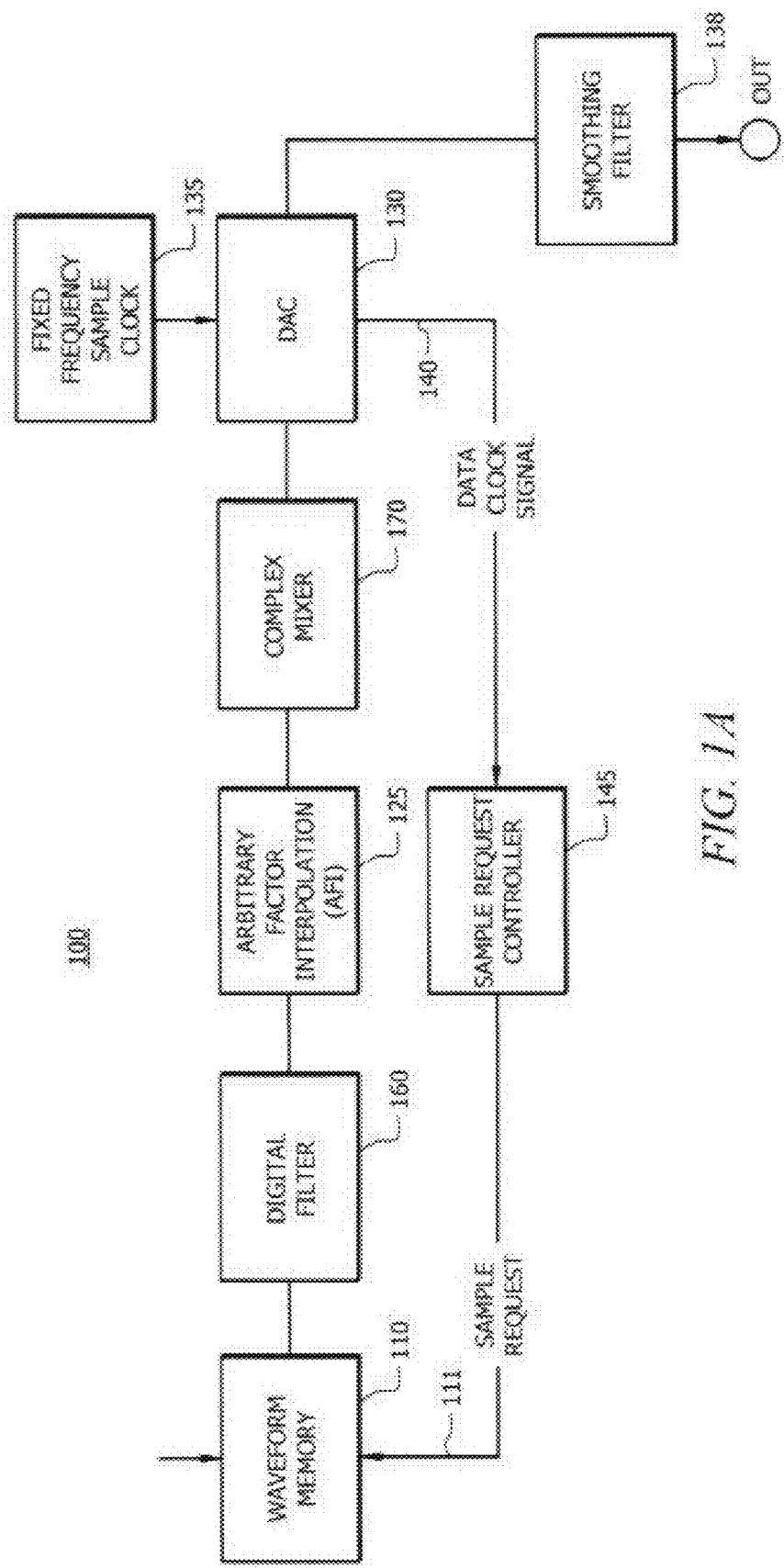
FIG. 1A is a block diagram schematic of an AWG comprising a fixed frequency DAC sample clock in conjunction with an AFI, according to an embodiment of the invention.

Disclosed embodiments are described with reference to the attached figures, wherein like reference numerals are used throughout the figures to designate similar or equivalent elements. The figures are not drawn to scale and they are provided merely to illustrate the disclosed embodiments. Several aspects are described below with reference to example applications for illustration. It should be understood that numerous specific details, relationships, and methods are set forth to provide a full understanding of the disclosed embodiments. One having ordinary skill in the relevant art, however, will readily recognize that the disclosed embodiments can be practiced without one or more of the specific details or with other methods. In other instances, well-known structures or operations are not shown in detail to avoid obscuring the disclosed embodiments. The disclosed embodiments are not limited by the illustrated ordering of acts or events, as some acts may occur in different orders and/or concurrently with other acts or events. Furthermore, not all illustrated acts or events are required to implement a methodology in accordance with disclosed embodiments.

Disclosed embodiments include AWGs that comprise a fixed frequency DAC sample clock in conjunction with an AFI that uses real-time digital signal processors. In one embodiment the AWG is implemented using an FPGA, which can optionally include the waveform memory. However, embodiments of the invention also include ASIC and discrete AWG implementations.

The signal synthesis described herein uses a fixed frequency DAC sample clock in combination with a real-time AFI. The AFI converts waveform samples having any arbitrary sample rate to the fixed DAC sample rate. The samples are clocked into the DAC at a fixed rate regardless of whether the DAC interpolates or not. Following interpolation by the AFI, fine center frequency tuning and gain adjustment can be performed by a complex mixer. The DAC is coupled to the output of the complex mixer and outputs analog waveforms.

In one embodiment the DAC comprises a conventional DAC that provides only analog conversion. However, in other embodiments the DAC can be an interpolating DAC that interpolates the received signal by an additional integer factor. The DAC can also provide coarse frequency shifting to center the signal's spectrum to the desired IF.

Disclosed systems provide several advantages over conventional FPGA-based AWGs that include real-time signal processing. First, unlike such systems which utilize variable DAC sample rates, disclosed embodiments utilize a fixed DAC sample rate. This inventive aspect allows the use of a single analog filter to remove distortion images at the DAC output independent of the waveform sample rate. Second, because the waveform is interpolated in real-time, it can be stored in the waveform memory at virtually the minimum sample rate required to reconstruct the signal. This yields significant memory savings of up to several orders of magnitude. For example, the interpolation factor can extend to 10,000 or more, making possible even more memory savings for signals sampled at slow rates. Additionally, using a DAC with coarse frequency shifting ability and interpolation allows even higher IFs to be generated. Consequently, the filtering burden of the UC is relaxed by an increased separation between the signal and its mirror spectrum.

FIG. 1A is a block diagram schematic of an AWG 100 comprising a fixed frequency DAC sample clock 135 in conjunction with an AFI 125, according to an embodiment of the invention. AWG 100 comprises a waveform memory 110, coupled to a digital pulse shaping filter 160 for signal preprocessing that receives waveform signals that in some embodiments can comprise waveform symbols (e.g., I/Q constellation points) from waveform memory 110. Digital pulse shaping filter 160 is coupled to the AFI 125. As described above, digital pulse shaping filter 160 is optional, but is generally advantageous since it provides further memory compression for digitally modulated signals.

The AFI 125 is coupled to complex mixer 170, with complex mixer 170 being coupled to DAC 130. DAC is clocked by a fixed frequency DAC sample clock 135, such as a crystal controlled oscillator. The output of DAC 130 is shown coupled to smoothing filter 138, whose output provides the output of the AWG 100. Smoothing filter 138 can be embodied as a single standard analog low pass filter as enabled by standard passive/active analog components (e.g. resistors, capacitors, amplifiers). This is in contrast to the requirement of multiple, switchable smoothing filters as required when the DAC sample clock is a conventional variable frequency clock.

Waveform memory 110 receives a sample request control signal 111 from a sample request controller 145 that is coupled to the DAC 130 that provides a data clock signal for controlling the timing of the request for samples from the waveform memory 110 so that they occur at only appropriate time instants. Since the waveform samples are stored in memory, these samples requests can be made synchronously with the fixed AFI output sample rate, thus the AFI 125 does not add jitter to the signal. AFI 125 increases the sample rate of the waveform from waveform memory 110 by an arbitrary factor R (i.e. an integer or a non-integer) to match the fixed DAC sampling rate to allow real-time continuously variable SRC by arbitrary factors. As described above, the real-time digital signal processing for such AWGs can be realized in some embodiments using an FPGA which provide programmability and optionally the ability for reprogrammability.

Figure 1B:
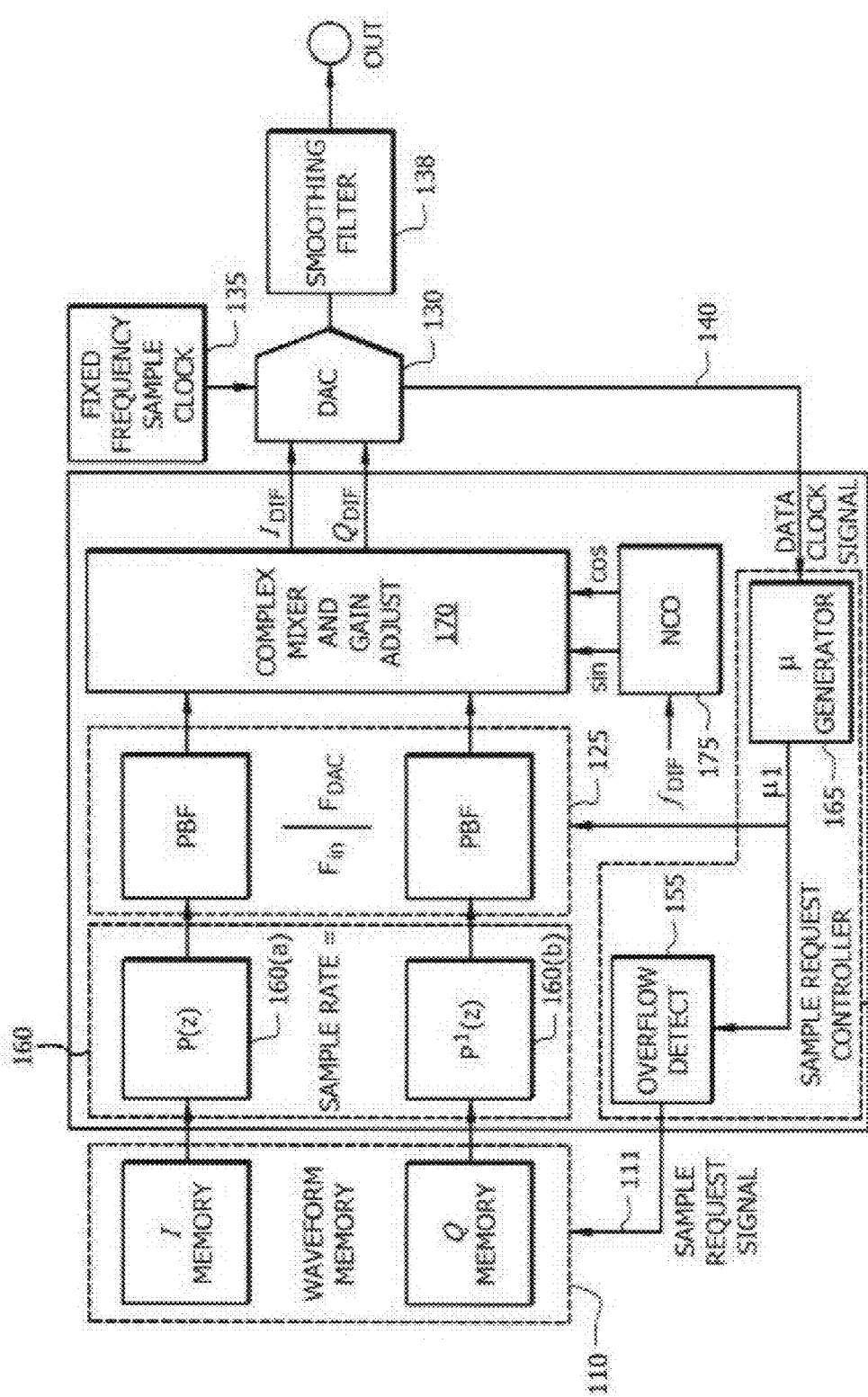
FIG. 1B is a block diagram schematic of an AWG comprising a fixed frequency DAC sample clock in conjunction with an AFI, according to another embodiment of the invention.

FIG. 1B is a block diagram schematic of an AWG 150 comprising a fixed frequency DAC sample clock 135 in conjunction with an AFI, according to another embodiment of the invention. The large square shaped portion identified as "FPGA AWG" can all be implemented on an FPGA, along with the waveform memory 110 provided the FPGA has sufficient memory. As shown in FIG. 1B, waveform memory 110 is not FPGA implemented.

Waveform memory 110 is shown comprising I memory 111 and Q memory 112 that provide I and Q waveform samples, respectively. Digital pulse shaping filter 160 is shown as a user defined digital shaping filter comprising P(Z) 160(a) and P'(Z) 160(b) that can be embodied as polyphase Finite Impulse Response (FIR) filters that are coupled to I memory 111 and Q memory 112, respectively, for pulse shaping. AFI 125 is shown comprising a first PBF 125(a) coupled to P(Z) 160(a) and a second PBF 125(b) that is coupled to P'(Z) 160(b).

First PBF 125(a) and second PBF 125(b) are both coupled to complex mixer 170, which optionally also provides gain adjust. Complex mixer 170 is shown outputting $I_{DIF}$ and $Q_{DIF}$ to DAC 130. Sample clock 135 comprises a fixed frequency sample clock operating at fixed frequency $F_{DAC}$ Hz that clocks the sampling performed by DAC 130.

Sample request controller 145 is shown in FIG. 1B comprising a μ generator 165 and overflow detector 155 that generates the sample request signal 111 that is coupled to waveform memory 110. μ generator 165 is clocked by data clock 140 that is a clock derived from the sample clock 135. Data Clock 140 is also of frequency $F_{DAC}$ Hz. The μ generator 165 computes the normalized fractional time distance between the next interpolated output sample and the current input sample. The μ values provided by μ generator 165 are also coupled to AFI 125 which as described below uses this information to compute the next interpolated output sample.

AFI 125 can be embodied as a Farrow Structure which is a particular implementation of a PBF (see C. W. Farrow, "A continuously variable digital delay element," in Proc. IEEE Int. Symp. Circuits and Systems, Espoo, Finland, June 1998, pp. 2641-2645). PBFs can be used for continuously variable sample rate conversion by arbitrary factors. This class of filters finds efficient real-time implementation in the Farrow Structure and its variants. PBFs can also be designed directly from a set of frequency domain specifications. PBFs can also be formed by constructing an impulse response of N concatenated polynomials of order M and length Tin, where Tin=1/Fin is the sample period of the interpolator input. The computational cost is (M+1)N multiplications at the lower input sample rate, and only M multiplications at the higher output sample rate. Constraining the impulse response to be symmetric about (N/2)Tin yields a linear phase filter with symmetric polynomial coefficients. This reduces the number of fixed coefficients required for implementation resulting in (M+1)N/2 multiplications at the input sample rate for N even and (M+1)((N−1)/2)+[(M+1)/2] for N odd. The impulse response of AFI 125 can be represented as:

$$h_a(t) = \sum_{n=0}^{N-1} \sum_{m=0}^{M} c_m(n)(2\mu_l - 1)^m,$$

where the cm(n)'s are the fixed polynomial coefficients and μl is the time distance between the desired output sample and the current input sample as a fraction of the input sample period, $\mu_l \in [0, 1)$.

The Inventors have recognized that design specifications for PBFs can be derived by observing that any time the sample rate of a signal is increased, images are created at multiples of the original sample rate. Consequently, to interpolate low pass signals of single sided bandwidth B, then the interpolation filter needs to eliminate images residing in the frequency bands $kF_{in} \pm B$, where k=1, 2, . . . , and $F_{in}$ is the sample rate of the signal at the interpolator input.

μgenerator 165 computes of the fractional interval μl for AWG 150. μ generator 165 can comprise an overflowing accumulator or other functionally equivalent structure capable of computing μl as follows:

$$\mu_l + 1 = \mu_l + \frac{T_{DAC}}{T_{in}} - \left\lfloor \mu_l + \frac{T_{DAC}}{T_{in}} \right\rfloor,$$

where l is the output sample index, [•] is the floor operator and the computation is performed at the output sample rate $F_{DAC}$. Since the sample rate is increased, multiple output samples can be generated for each input sample. When a new input sample is needed, the generated μ value $\mu_1$ is less than or equal its previous μ value. Thus, the $\mu_1$ values increase over each input sample period. This condition is indicated when the accumulator overflows signals a "new input sample request". As a result, this technique eliminates the need for an adjustable sample clock making possible the use of a fixed frequency oscillator for sample clock 135 for clocking the DAC 130. Also, because the DAC sample clock 135 is a fixed frequency clock, a single analog filter such as smoothing filter 138 can be used to remove DAC images regardless of the original sample rate at which the waveform samples were generated by waveform memory 110.

Sample request signal 111, which prompts new input samples requests from waveform memory 110, is shown in FIG. 1B generated by an overflow detector 155 which monitors the μl values received from μ generator 165 for the condition:

μl+1≧μl     (1)

Figure 2:
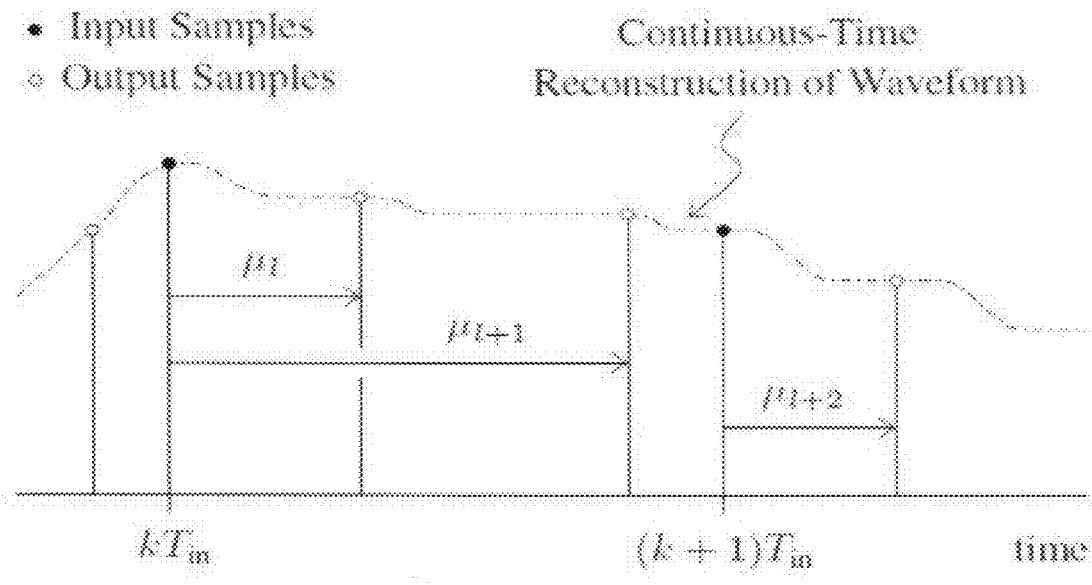
FIG. 2 shows input/output timing for an AFI embodied as a Farrow Structure, according to an embodiment of the invention.

Satisfying this condition is used to indicate that a new input sample is required from waveform memory 110 for AWG 150 to generate the next interpolated output sample. In this arrangement, AFI 125 takes as an input a Discrete-Time (DT) signal provided by pulse shaping digital filters P(z) 160(a) and P'(Z) 160(b) that is sampled at $F_{in}$ Hz. The Continuous-Time (CT) signal underlying the DT input signal is then reconstructed and resampled by AFI 125 at a rate of $F_{out} = F_{DAC}$ Hz as depicted in FIG. 2. The output sample rate provided by is given by $F_{out} = RF_{in}$. R is the SRC factor defined as:

R=$F_{out}/F_{in}$     (2)

Upon a new input sample request, waveform samples are supplied from Waveform Memory 110 to the digital filter(s) P(z) 160(a) and P'(Z) 160(b). If the digital pulse shaping filter 160 is interpolating, then the sample requests derived from the overflow detector 155 request samples from digital pulse shaping filter 160. Digital pulse shaping filter 160, in turn, requests samples from waveform memory 110 at a slower rate. Digital pulse shaping filter 160 serves at least two purposes. First, it can provide real-time pulse shaping for digital modulation schemes. Thus, in the case of symbols generated by waveform memory 110, only the symbol values are needed to be stored in waveform memory 110, rather than a highly oversampled waveform representation of the symbols. Details on implementing digital pulse shaping filter 160 as a pulse shaping filter can be found in M. T. Hunter, W. B. Mikhael, and A. G. Kourtellis, "Direct if synthesis of vector modulated signals using real-time signal processing," in Proceedings of the 2008 IEEE International Instrumentation and Measurement Technology Conference, 2008. I2MTC 2008, Victoria, Vancouver Island, Canada, May 2008, pp. 1853-1858, hereafter "Hunter, et al.". Second, digital pulse shaping filter 160 can simply interpolate the input waveform by a small integer factor. This can reduce the complexity of the AFI 125 significantly for a given application.

Figure 3:
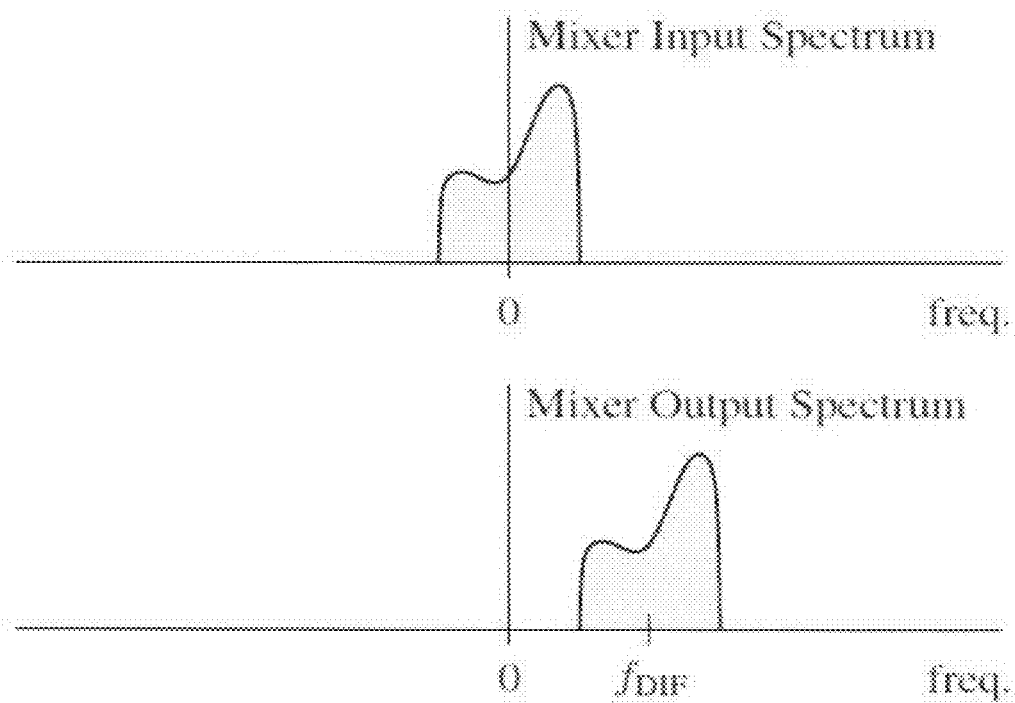
FIG. 3 shows input/output spectra for a complex mixer in an AWG system, according to an embodiment of the invention.

After the DT signal is filtered and interpolated as output by AFI 125, the filtered and interpolated DT signal is coupled to complex mixer and optional gain adjust block 170. Gain adjustment can be performed to fine tune the signal output level. It is then mixed by the complex mixer 170 with a complex exponential of frequency $f_{DIF}$ Hz whose real and imaginary parts are generated by a Numerically Controlled Oscillator (NCO) 175. Assuming the input spectrum to the complex mixer is centered at DC, this operation produces a complex bandpass signal centered at $f_{DIF}$ Hz as shown in FIG. 3. If the AWG 150 is used as the baseband/IF source in a SI, it provides the input signal to the UC component (not shown in FIG. 1B).

The AWG can comprise a DAC 130 that provides interpolation by integer factors and also provides complex, coarse frequency shifting (e.g., see "Ad9786 data sheet, rev. b," Analog Devices, 2005. [Online]. http://www.analog.com/UploadedFiles/Data Sheets/AD9786.pdf10). This combination simplifies the filtering burden of the UC. This is because the additional frequency shift increases the separation between the signal and its mirror spectrum. As can be seen from FIG. 3, there is no mirror spectrum while the signal is in complex form.

Figure 4:
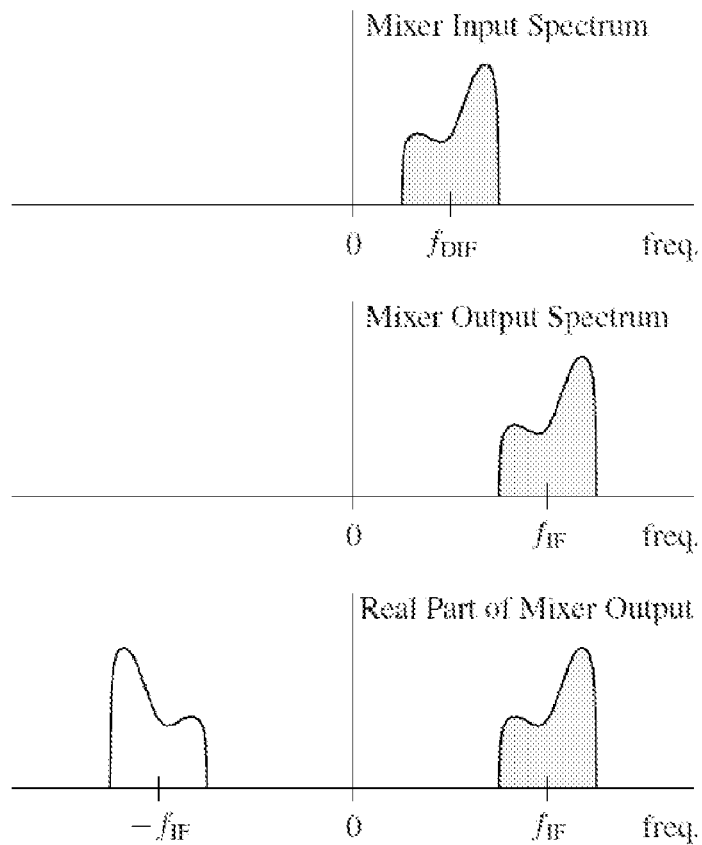
FIG. 4 shows input/output spectra for a DAC that receives a complex input in an AWG system, according to an embodiment of the invention.

The mirror spectrum only appears when the complex bandpass signal is converted to a real bandpass signal as illustrated in FIG. 4. This is the final step the signal undergoes before it is converted to the analog waveform output by the DAC 130.

Figure 5:
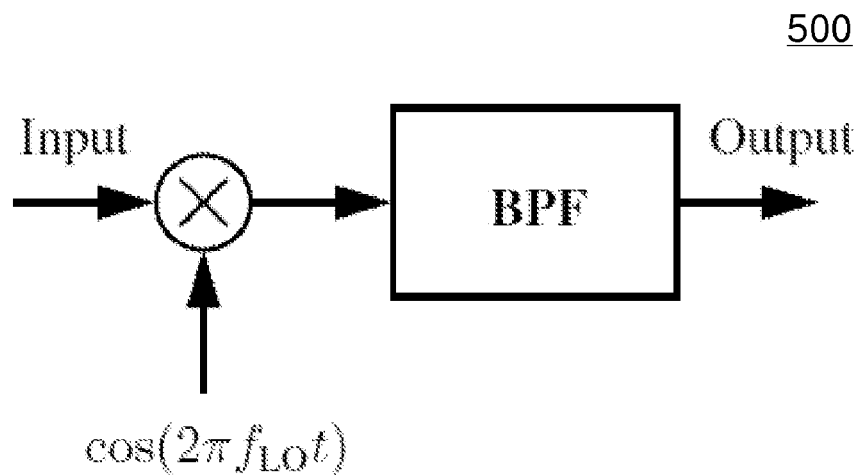
FIG. 5 is a subcircuit representation of an upconverting mixer coupled to a band pass filter useful for demonstrating certain aspects of some disclosed embodiments.
Figure 6:
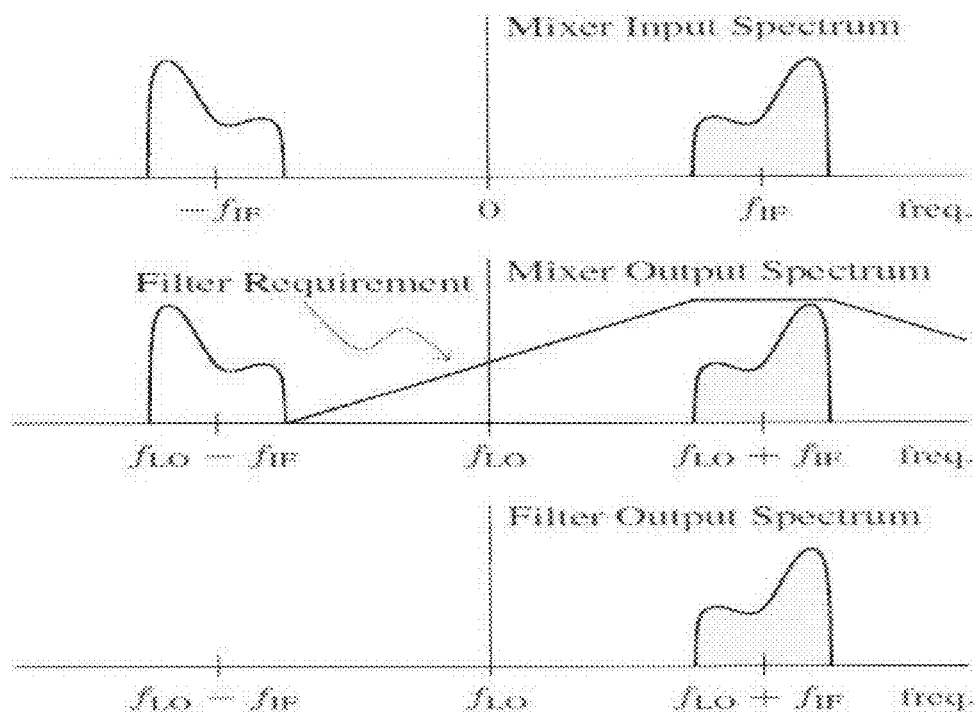
FIG. 6 shows input/output spectra for the subcircuit shown in FIG. 5.

FIG. 5 shows an exemplary subcircuit 500 for real upconversion comprising a mixer that receives an input signal coupled to a band pass filter (BPF) that demonstrates why the UC filtering requirement is relaxed by a higher IF frequency. The mixer shown as "X" in FIG. 5, which is analogous in function to that provided by the complex mixer in the complex mixer and optional gain adjust block 170 shown in FIG. 1, translates the frequency of the entire input spectrum to $f_{LO}$ Hz. Since this is a real upconversion, both the desired signal and its mirror spectrum are translated. The BPF shown is for eliminating the translated mirror spectrum located $2f_{IF}$ from the desired spectrum. As $f_{IF}$ is increased, the separation between the mirror spectrum and the desired spectrum is also increased. This in turn allows a more relaxed filtering requirement as depicted in FIG. 6.

Applications for AWGs according to embodiments of the invention include those applications that can benefit from a high speed analog signal source, such as for an UC in a SI. For example, automatic electronic test systems (see FIG. 12 described below) that can benefit from AWGs described herein as well as software defined radio, including both receivers and transmitters. Embodiments of the invention also include software to enable programming of FPGAs to implement AWGs described herein, such as at a customer's site. As described above, when embodied as a FPGA-based signal synthesizer according to an embodiment of the invention particularly when provided with a high speed interpolating DAC, creates a flexible, high performance analog signal source.

The software can be embodied as non-modifiable software to implement a single implementation, software that provides a user selectable menu of implementation options, or software that is continuously configurable or reconfigurable. One embodiment is a configurable FPGA "core" generator which may be configured as desired by a user to produce an FPGA netlist ready for implementation.

A method of programming a FPGA to provide an AWG according to an embodiment of the invention realizes AWG functionality that couples between a waveform memory that provides a digital waveform signal at a sample rate and a DAC having a fixed frequency sample clock for clocking the DAC to provide a fixed DAC sample rate. As described above, the FPGA can also optionally provide the waveform memory. The AWG functionality is realized by programming the FPGA by applying a preconfigured, non-modifiable FPGA netlist to the FPGA to implement the AWG functionality.

The AWG functionality comprises an AFI coupled to receive a digital waveform signal or a processed digital waveform signal originating from the waveform memory to provide an interpolated digital signal. A complex mixer for carrier modulation is coupled to the AFI, wherein the complex mixer receives the interpolated digital signal and outputs a complex band pass signal. The DAC is coupled to an output of the complex mixer for receiving the complex band pass signal to provide an analog output signal and wherein the DAC provides a data clock signal. The AWG functionality also comprises a sample request controller for receiving the data clock signal and generating a sample request signal, wherein the sample request signal is coupled to the waveform memory, and wherein the sample request signal controls times for requesting the digital waveform signal from the waveform memory. The AWG has the feature disclosed herein that the interpolated digital signal provided by the AFI is sampled at the fixed DAC sample rate independent of the sample rate of the digital waveform signal.

In a related embodiment, the method further comprising generating the FPGA netlist, wherein the applying comprises applying a preconfigured, non-modifiable FPGA netlist using a software package that provides a graphical user interface (GUI) with a plurality of menu of options for customizing the configuration of the AWG functionality before generating the FPGA netlist.

EXAMPLES

Embodiments of the invention are further illustrated by the following specific Examples, which should not be construed as limiting the scope or content of embodiments of the invention in any way.

A real implementation of a working prototype system is described below that demonstrates the feasibility and performance of an AWG including a fixed sample clock and real time arbitrary factor interpolation based on the subject matter described herein. Measured results are given confirming expectations from design and simulation.

Hardware Implementation

A high performance system analogous to AWG 150 shown in FIG. 1B was implemented on a Xilinx xc3s5000-4fg900 Spartan-3 FPGA in conjunction with a 16-bit Analog Devices interpolating DAC. The DAC 130 was configured (i.e. via software) to interpolate the complex input signal by a factor of 8. The DAC sample clock 135 was fixed at $F_{DAC}$=311.04 MHz. Since the DAC 130 interpolates the output of the FPGA AWG portion of the AWG by a factor of 8, it provides a Data Clock of FDAC/8=38.88 MHz, rather than $F_{DAC}$ MHz.

Figure 7:
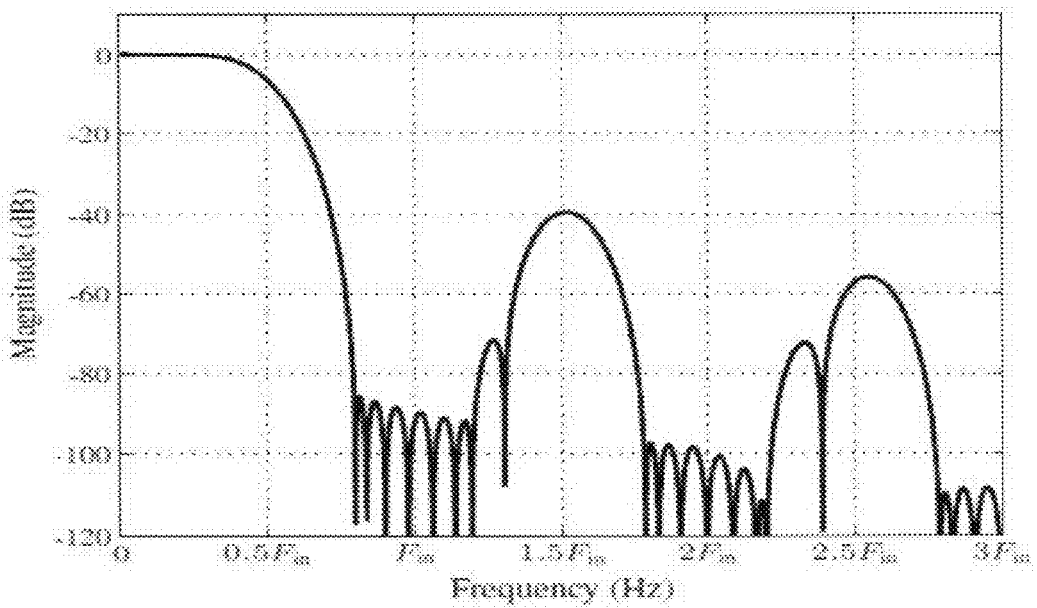
FIG. 7 shows the frequency response for a polynomial based filter (PBF) having M=5 and N=8.

Digital pulse shaping filter 160 was implemented as is a programmable, 95-tap, interpolate by 4 polyphase FIR filter. FIR 125 was embodied as a Farrow Structure that implements a PBF having N=10 polynomial pieces of order M=5 (See Hunter, et al. for example). The FIR 125 was designed to provide more than 87 dB of interpolation image suppression for single-sided input bandwidths up to $0.2F_{in}$. The frequency response of the FIR 125 embodied as a Farrow Structure is shown in FIG. 7.

The Farrow Structure input sample rate was not restricted, and thus can be set to be equal to the output sample rate. However, in practice, the system implementation cost could be reduced by lowering the maximum input sample rate to the FIR 125. However, this comes at the cost of reduced maximum signal bandwidth. The device utilization summary is given in Table 1 below.

TABLE 1

Device Utilization for Xilinx Part # xc3s5000-4fg900

| Logic Utilization | Used | Available | Utilization |
|---|---|---|---|
| Number of Slice Flip Flops | 20,482 | 66,560 | 30% |
| Number of 4 input LUTs | 11,061 | 66,560 | 16% |
| Total Equivalent Gate Count | 1,007,485 | — | — |

Measured Results

To demonstrate the performance of the exemplary system, the AWG 150 was set up to generate a 1 Msymbol/sec, raised cosine pulse-shaped Quaternary Phase Shift Keying (QPSK) signal from only its symbols. The 1 Msymbol/sec QPSK symbol stream was shaped and interpolated by four, in real-time, by digital pulse shaping filter 160 before entering the AFI 125 embodied as a Farrow Structure. This interpolation by four results in $F_{in}$=4 MHz. The corresponding SRC factor is given by:

$$R = Fout/Fin = 38.88 \text{ MHz}/4 \text{ MHz} = 9.72$$

Figure 8:
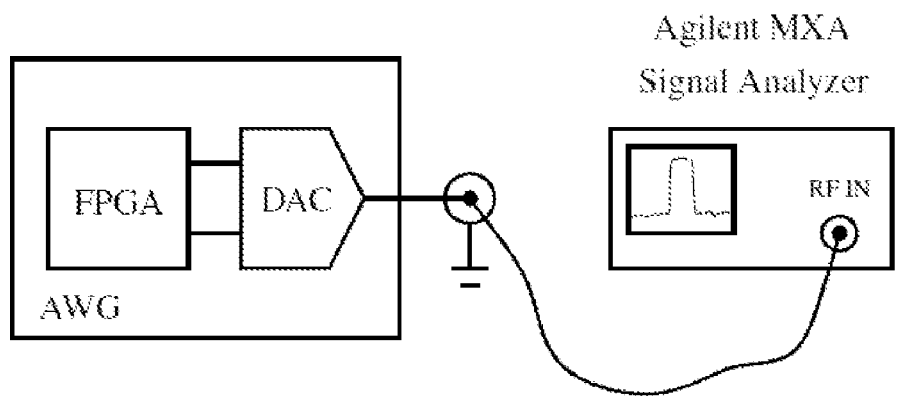
FIG. 8 shows a measurement test setup used to test prototype AWGs according to an embodiment of the invention as described in the Examples provided.
Figure 9:
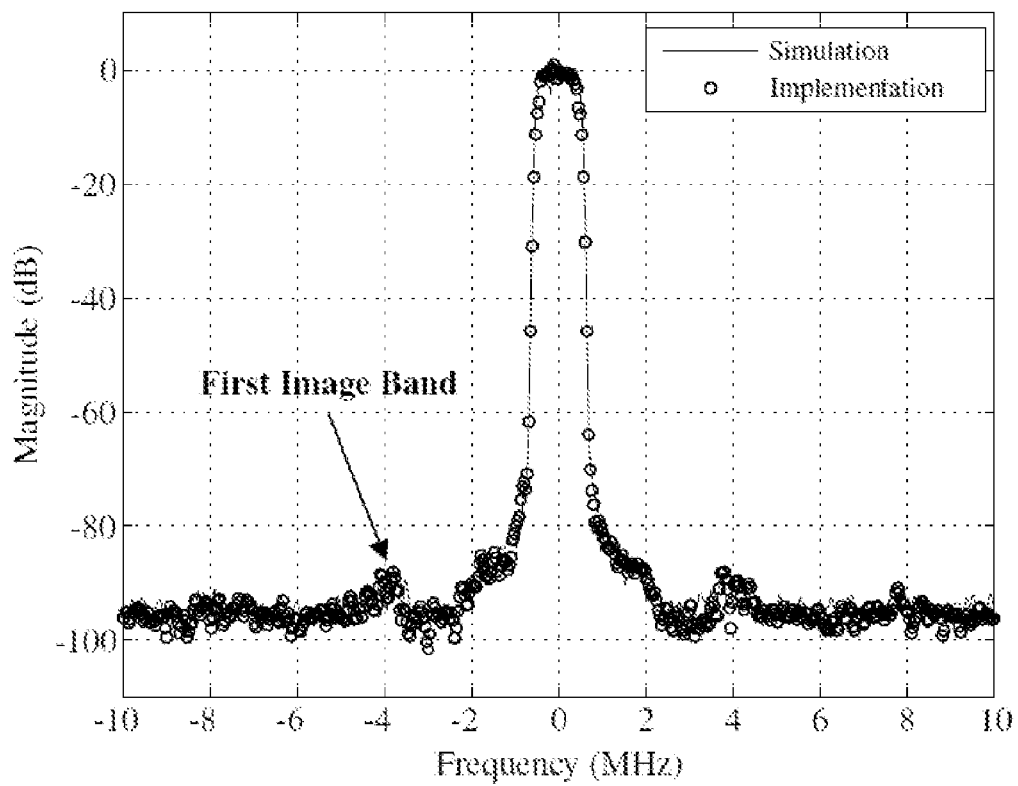
FIG. 9 shows the spectrum obtained from simulation and a prototype FPGA AWG implementation of QPSK signals, according to an embodiment of the invention.

The test setup used is shown in FIG. 8. In FIG. 8, the analog output of the AWG 150 was connected to an Agilent MXA Signal Analyzer for spectral analysis. As a first step, the implementation output was captured and stored in memory before exiting the FPGA. FIG. 9 presents the AWG output spectrum generated from bit-true simulation as well as the actual output spectrum captured from the FPGA implementation. As can be seen from FIG. 9, the two spectrums closely match.

Figure 10:
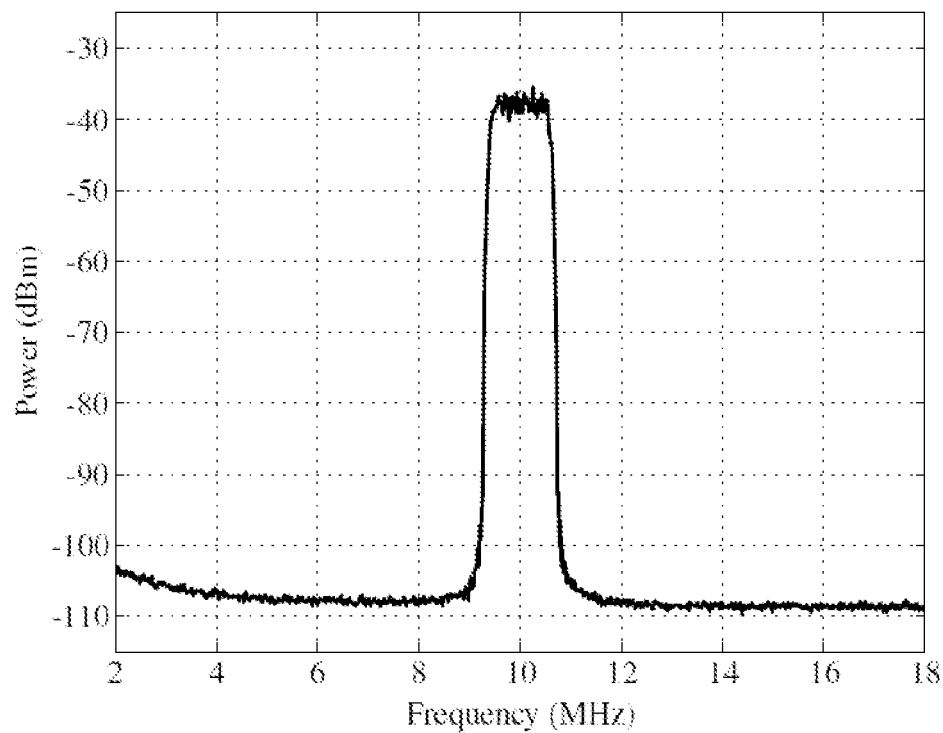
FIG. 10 shows an output spectrum taken from the DAC output of a prototype FPGA AWG implementation according to an embodiment of the invention for a QPSK signal centered at 10 MHz.
Figure 11:
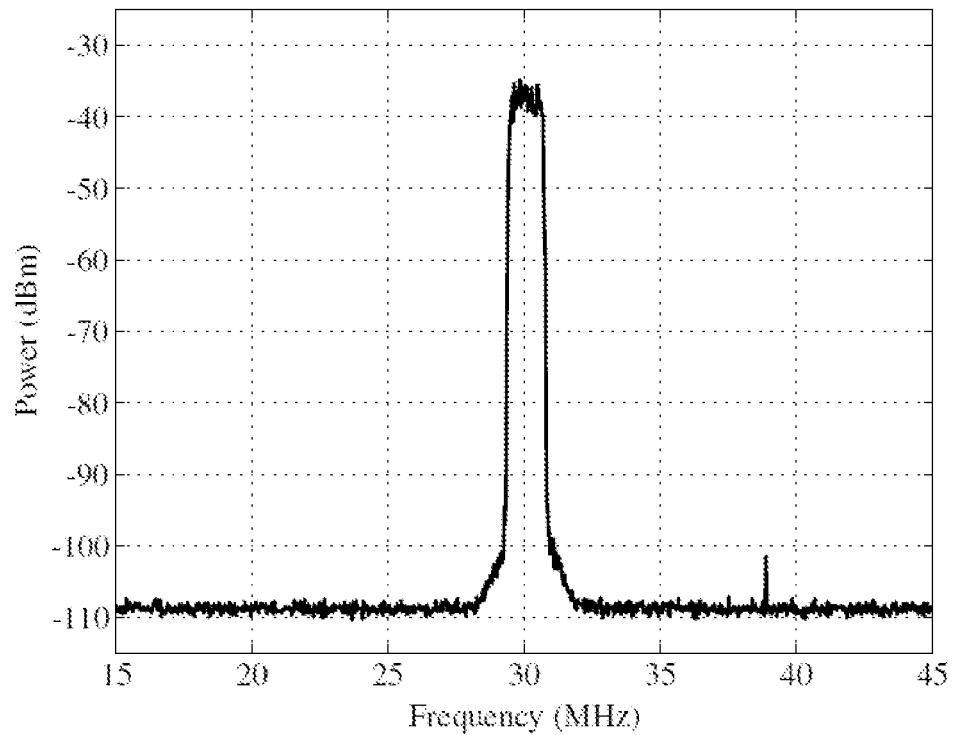
FIG. 11 shows an output spectrum taken from the DAC output of a prototype FPGA AWG implementation according to an embodiment of the invention for a QPSK signal centered at 30 MHz.

In addition, the designed interpolation image suppression, FIG. 7, matches the actual interpolation image suppression. The AWG analog output results are given next. FIGS. 10 and 11 are plots of the spectrum trace data saved from the Agilent MXA. In FIG. 10, the DAC 130 does not appear to shift the AWG output spectrum. The AWG NCO 175 was tuned to $f_{DIF}$=10 MHz. Thus, the DAC output spectrum was centered at 10 MHz. As can be seen from FIG. 10, there was no visible image distortion or sample clock spurious, which is in contrast with the plots from conventional AWG systems that comprise FPGAs for real-time signal processing that have a DAC sample clock provides a variable frequency output that results in a variable DAC sampling rate, where sample clock spurious and/or image distortion were found to appear at about 50 dBc. This confirms the high performance expected.

FIG. 11 shows the DAC output spectrum when the DAC is configured to shift the center of the spectrum by FDAC/8=38.88 MHz. In this scenario, the AWG 150 frequency tunes the signal's spectrum to $f_{DIF}$=−8.88 MHz resulting in a DAC IF output of $f_{IF}$=38.88+(−8.88)=30 MHz. The feasibility of high IF signal synthesis is thus demonstrated, even when the waveform is generated at a much lower frequency. As previously described, the filtering requirement of the UC is significantly relaxed.

Figure 12:
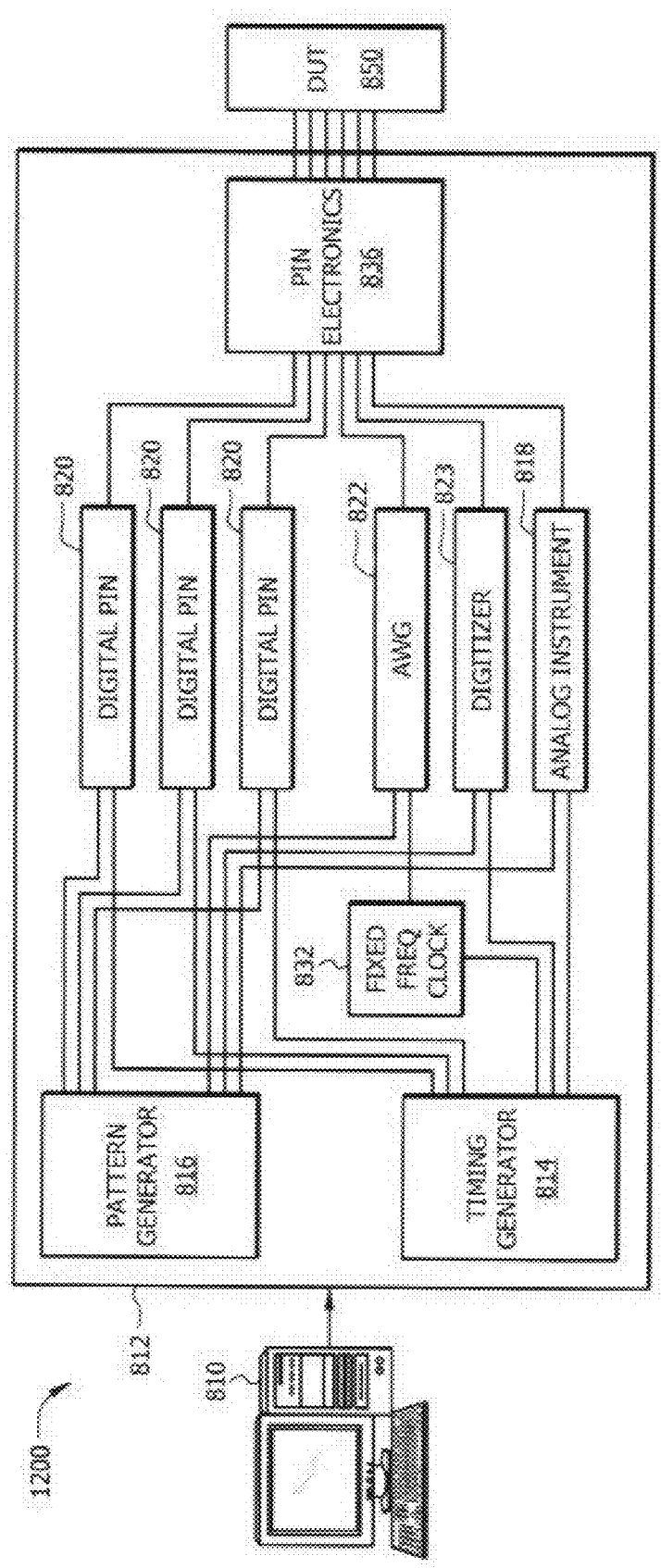
FIG. 12 is a block diagram in greatly simplified form of an electronic test system which can be improved using an AWG described herein, that can be used to test semiconductor chips.

FIG. 12 is a block diagram in greatly simplified form of an electronic test system 1200 which can be improved using an AWG described herein, that can be used to test semiconductor devices. The test system 1200 includes a work station 810 that controls the test system 1200. Work station 810 runs test programs that set up the hardware within tester body 812 and reads back results of tests. The work station also provides an interface to a human operator so that the operator can provide commands or data for testing a particular type of semiconductor device. For example a program running on work station 810 might change the frequency of a clock within the test system by changing the value of a register inside tester body 812.

To fully test many types of devices, both analog and digital test signals must be generated and measured. Inside tester body 812 are digital "pins" 820 and analog instruments 818. Both are connected to the device under test (DUT) 850. Digital pins are circuits that generate or measure digital signals or DC voltages and currents. In contrast, analog instruments generate and measure analog signals.

Pattern generator 816 provides control inputs to the digital pins 820 and the analog instruments 818. These control inputs define both the values and the time at which test signals should be generated or measured. To ensure an accurate test, the actions of the digital pins and the analog instruments are often must be synchronized. Timing generator 814 provides timing signals that synchronize operation of the various components within tester body 812.

Automatic test equipment is made programmable so that it can test many different types of devices. It is often desirable to be able within automatic test equipment to generate a digital clock of a programmable frequency that has very low jitter. An example of such an application is called an AWG. AWG 822 shown in FIG. 12 creates a waveform that can be programmed into an almost any arbitrary shape using a fixed frequency DAC sample clock 832, whereas conventional AWGs use a DAC sample clock that allows the frequency to be controlled and is generally referred to as a "controllable frequency" DAC sample clock, such as from timing generator 814 shown in FIG. 12. Automatic test equipment also sometimes contains an analog instrument called a digitizer. Digitizer 823 also relies on a clock, which is generally programmable. System 1200 also includes pin electronics 836 which is coupled to an output of the AWG 822 for applying signals including the analog test signals to the DUT 850.

More generally, there are many other applications where signals, such as sine waves or vector modulated signals of high spectral purity are desirable beyond for testing devices such as semiconductor chips. As described above, systems such as automatic test systems with AWGs described herein not only generate signals with improved spectral purity, they can be accomplished in a less complex system.

While various embodiments of the invention have been described above, it should be understood that they have been presented by way of example only, and not limitation. Numerous changes to the disclosed embodiments can be made in accordance with the disclosure herein without departing from the spirit or scope of the disclosed embodiments. Thus, the breadth and scope of embodiments of the invention should not be limited by any of the above explicitly described embodiments. Rather, the scope of the invention should be defined in accordance with the following claims and their equivalents.

Although the embodiments of invention have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting to embodiments of the invention. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

The invention claimed is:

1. An arbitrary waveform generator (AWG), comprising:
a waveform memory for providing a digital waveform signal at a sample rate;
an arbitrary factor interpolator (AFI) coupled to receive said digital waveform signal or a processed digital waveform signal to provide an interpolated digital signal;
a complex mixer for carrier modulation coupled to said AFI, said complex mixer receiving said interpolated digital signal and outputting a complex band pass signal;
a digital to analog converter (DAC) coupled to an output of said complex mixer for receiving said complex band pass signal to provide an analog output signal;
a fixed frequency sample clock for clocking said DAC to provide a fixed DAC sample rate, wherein said DAC provides a data clock signal, and
a sample request controller for receiving said data clock signal and generating a sample request signal, said sample request signal coupled to said waveform memory, wherein said sample request signal controls times for requesting said digital waveform signal from said waveform memory;
wherein said interpolated digital signal provided by said AFI is sampled at said fixed DAC sample rate independent of said sample rate of said digital waveform signal.

2. The AWG of claim 1, further comprising a digital pulse shaping filter coupled between an output of said waveform memory and an input of said AFI for generating said processed digital waveform signal comprising a shaped digital signal and providing said shaped digital signal to said AFI.

3. The AWG of claim 1, wherein said AFI comprises a polynomial based filter (PBF).

4. The AWG of claim 3, wherein said PBF comprises a Farrow Structure.

5. The AWG of claim 2, wherein said digital pulse shaping filter comprises a polyphase FIR.

6. The AWG of claim 1, wherein said AFI is implemented on a FPGA.

7. The AWG of claim 1, wherein said DAC comprises an interpolating and frequency shifting DAC.

8. The AWG of claim 1, wherein said sample request controller comprises a $\mu$ generator and a series connected overflow detector that generates said sample request signal.

9. The AWG of claim 8, wherein said overflow detector comprises an overflow accumulator.

10. The AWG of claim 9, wherein said $\mu$ generator is operable to calculate and output a parameter $\mu l$ that is coupled to said overflow accumulator using the following calculation:

$$\mu_l + 1 = \mu_l + \frac{T_{DAC}}{T_{in}} - \left\lfloor \mu_l + \frac{T_{DAC}}{T_{in}} \right\rfloor;$$

where l is the output sample index, $T_{DAC}/T_{IN}$ is a floor operator and said calculation is performed at the said fixed DAC sample rate.

11. The AWG of claim 1, further comprising a fixed analog smoothing filter coupled to an output of DAC.

12. A method for signal synthesis, comprising:
receiving a digital waveform signal at a sample rate;
arbitrary factor interpolating said digital waveform signal or a processed digital waveform signal to provide an interpolated digital signal at a first sample rate;
processing said interpolated digital signal to generate a complex band pass signal, and
digital to analog (D/A) converting said complex band pass signal to provide an analog output signal, wherein a single fixed frequency sample clock is used for said D/A converting to provide a fixed DAC sample rate that is equal to said first sample rate.

13. The method of claim 12, further comprising shaping said digital waveform signal to provide said processed digital waveform signal comprising a shaped digital signal, and coupling shaped digital signal for said arbitrary factor interpolating.

14. The method of claim 12, further comprising:
generating a data clock signal from said fixed DAC sample rate;
receiving said data clock signal and generating a sample request signal;
coupling said sample request signal to a waveform memory that provides said digital waveform signal, wherein said sample request signal controls times for requesting said digital waveform signal from said waveform memory.

15. The method of claim 12, further comprising smoothing said analog output signal with a fixed analog filter.

16. The method of claim 12, wherein said analog output signal comprises a vector modulated signal.

17. The method of claim 16, wherein said vector modulated signal comprises an I/Q signal.

18. A method of programming a field programmable gate array (FPGA) to provide an arbitrary waveform generator (AWG) by realizing AWG functionality that couples between a waveform memory that provides a digital waveform signal at a sample rate and a digital to analog converter (DAC) having a fixed frequency sample clock for clocking said DAC to provide a fixed DAC sample rate, said realizing AWG functionality comprising:
   applying a preconfigured, non-modifiable FPGA netlist to said FPGA to implement said AWG functionality, said AWG functionality comprising:
      an arbitrary factor interpolator (AFI) coupled to receive a digital waveform signal or a processed digital waveform signal originating from said waveform memory to provide an interpolated digital signal;
      a complex mixer for carrier modulation coupled to said AFI, said complex mixer receiving said interpolated digital signal and outputting a complex band pass signal;
      wherein said DAC is coupled to an output of said complex mixer for receiving said complex band pass signal to provide an analog output signal and wherein said DAC provides a data clock signal, and
      a sample request controller for receiving said data clock signal and generating a sample request signal, wherein said sample request signal is coupled to said waveform memory, and wherein said sample request signal controls times for requesting said digital waveform signal from said waveform memory;
   wherein said interpolated digital signal provided by said AFI is sampled at said fixed DAC sample rate independent of said sample rate of said digital waveform signal.

19. The method of claim 18, further comprising generating said FPGA netlist, wherein said applying a preconfigured, non-modifiable FPGA netlist comprises using a software package that provides a graphical user interface (GUI) with a plurality of menu of options for customizing said configuring said AWG functionality before said generating said FPGA netlist.

20. An electronic test system for testing a device under test (DUT), comprising:
   a work station for controlling said system;
   an arbitrary waveform generator (AWG) for providing analog test signals to test said DUT, comprising:
      a waveform memory for generating a digital waveform signal at a sample rate;
      a digital pulse shaping filter coupled to an output of said waveform memory for shaping said digital waveform signal to provide a shaped digital signal;
      an arbitrary factor interpolator (AFI) coupled to said digital pulse shaping filter for receiving said shaped digital signal and providing an interpolated digital signal;
      a complex mixer for carrier modulation coupled to said AFI, said complex mixer receiving said interpolated digital signal and outputting a complex band pass signal;
      a digital to analog converter (DAC) coupled to an output of said complex mixer for receiving said complex band pass signal to provide said analog test signals;
      a fixed frequency sample clock for clocking said DAC to provide a fixed DAC sample rate, wherein said DAC provides a data clock signal, and
      a sample request controller for receiving said data clock signal and generating a sample request signal, said sample request signal coupled to said waveform memory, wherein said sample request signal controls times for requesting said digital waveform signal from said waveform memory;
   wherein said interpolated digital signal provided by said AFI is sampled at said fixed DAC sample rate independent of said sample rate of said digital waveform signal,
   and pin electronics coupled to an output of said AWG for applying signals including said analog test signals to said DUT.

* * * * *